United States Patent
Yang et al.

(10) Patent No.: US 12,484,042 B2
(45) Date of Patent: Nov. 25, 2025

(54) SCHEDULING REQUEST (SR) ENHANCEMENTS FOR 5G REAL-TIME EXTENDED REALITY (XR) SERVICES

(71) Applicant: Apple Inc., Cupertino, CA (US)

(72) Inventors: Weidong Yang, San Diego, CA (US); Dawei Zhang, Saratoga, CA (US); Wei Zeng, Saratoga, CA (US); Ralf Rossbach, Munich (DE); Haijing Hu, Los Gatos, CA (US); Chunxuan Ye, San Diego, CA (US); Sigen Ye, Whitehouse Station, NJ (US); Hong He, San Jose, CA (US); Haitong Sun, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 374 days.

(21) Appl. No.: 17/882,449

(22) Filed: Aug. 5, 2022

(65) Prior Publication Data

US 2024/0049215 A1    Feb. 8, 2024

(51) Int. Cl.
*H04W 72/1263*    (2023.01)
*H04W 72/21*    (2023.01)

(52) U.S. Cl.
CPC ....... *H04W 72/1263* (2013.01); *H04W 72/21* (2023.01)

(58) Field of Classification Search
CPC .................. H04W 72/1263; H04W 72/21
See application file for complete search history.

(56) References Cited

U.S. PATENT DOCUMENTS

| | | | | |
|---|---|---|---|---|
| 7,239,607 B1* | 7/2007 | Vijeh | .................... | H04L 47/125 370/258 |
| 2005/0138451 A1* | 6/2005 | Simpson | ........... | H04W 52/0225 713/320 |
| 2018/0368173 A1* | 12/2018 | Shaheen | ............... | H04W 72/23 |
| 2019/0230690 A1* | 7/2019 | Akkarakaran | ........ | H04W 72/21 |
| 2021/0176659 A1* | 6/2021 | He | .................... | H04W 28/0268 |
| 2021/0368534 A1* | 11/2021 | Sato | .................... | H04W 72/569 |

(Continued)

FOREIGN PATENT DOCUMENTS

WO    WO 18/232034    12/2018

OTHER PUBLICATIONS

International Search Report and Written Opinion dated Oct. 10, 2023, PCT/US2023,029387, 12 pages.

(Continued)

*Primary Examiner* — Won Tae C Kim
(74) *Attorney, Agent, or Firm* — Brownstein Hyatt Farber Schreck, LLP

(57) ABSTRACT

A user equipment (UE) includes a transceiver and a processor that is configured to identify a plurality of flows corresponding to data to be sent in an uplink (UL) direction. The processor is also configured to map a subset of the plurality of flows to a logical channel (LCH) of a plurality of LCHs. The processor is further configured to multiplex two or more scheduling requests (SRs) into an integrated SR for requesting one or more physical uplink control channel (PUCCH) resources corresponding to each flow of the subset of the plurality of flows of at least one LCH of the plurality of LCHs. Each SR included in the integrated SR corresponds to an SR for the data associated with at least one flow of the subset of the plurality of flows.

20 Claims, 11 Drawing Sheets

(56) References Cited

U.S. PATENT DOCUMENTS

2022/0322376 A1* 10/2022 Babaei .................. H04W 72/23
2024/0023155 A1*  1/2024 He ....................... H04W 72/543
2024/0098742 A1*  3/2024 Deghel ................. H04W 72/20

OTHER PUBLICATIONS

Vivo, "Discussion on XR specific capacity enhancements," $3^{rd}$ Generation Partnership Project (3GPP), TSG RAN WG1 #109-e, R1-2203586, e-Meeting, Mobile Competence Center, Sophia-Antipolis Cedex, France, May 9-20, 2022, 9 pages.

* cited by examiner

SCHEDULING REQUEST (SR) ENHANCEMENTS FOR 5G REAL-TIME EXTENDED REALITY (XR) SERVICES

TECHNICAL FIELD

This application relates generally to wireless communication systems, including methods and systems for various enhancements for a scheduling request (SR) for an extended reality (XR) service, such as a 5G real-time XR service.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In some deployments, the E-UTRAN may also implement NR RAT. In some deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
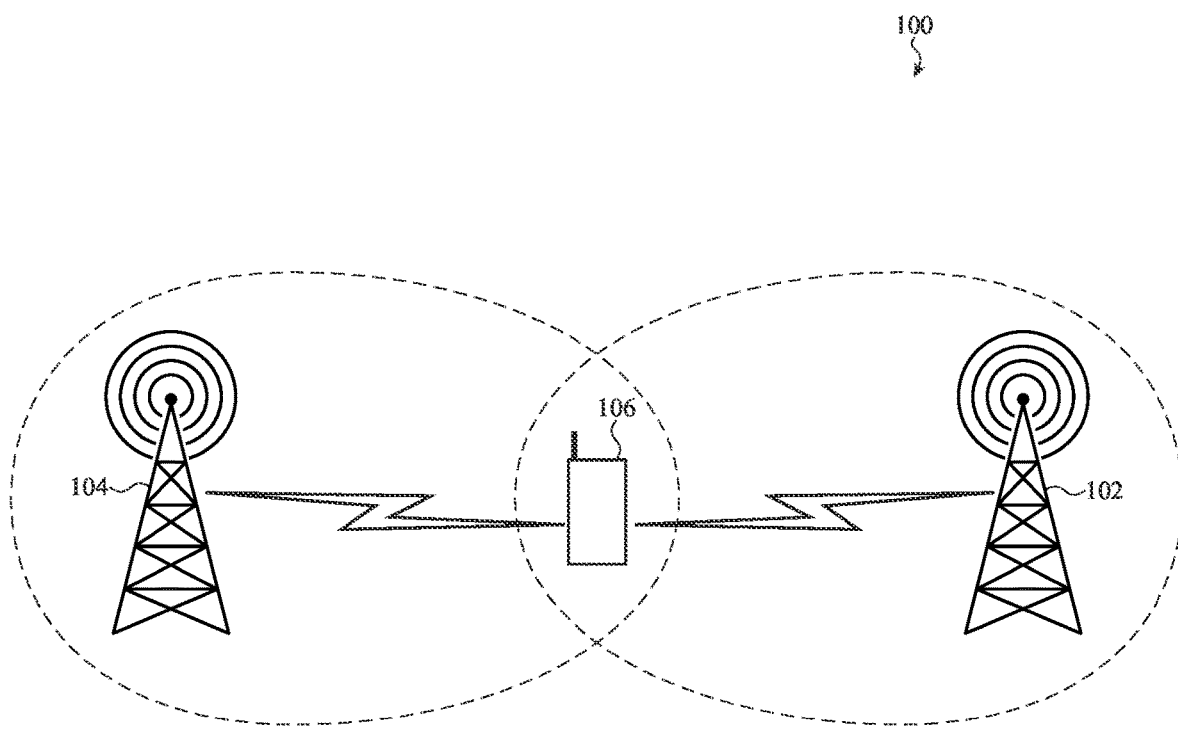
FIG. 1 shows an example wireless communication system, according to embodiments described herein.

In the present disclosure, various embodiments are related to systems and methods for SR enhancements for an XR service (referred to herein more simply as just "XR") or other special service (e.g., a 5G real-time XR service). In particular, various embodiments for SR enhancements for XR service, as described herein, may be related to XR-specific capacity improvements including, but not limited to, providing efficient resource allocation and scheduling for XR service characteristics. As examples, the XR service characteristics may be related to periodicity, various flows (e.g., call flows, quality of service (QoS) flows, and so on), jitter, latency, reliability, and so on. The efficient resource allocation and scheduling may be provided using a mechanism like semi-persistent scheduling (SPS), configured grants (CGs), dynamic scheduling, dynamic grants, and so on. Various embodiments, as described herein, may also provide improvements for XR service specific power saving techniques, to accommodate the XR service characteristics. In some embodiments, the XR service specific power saving techniques may be related to physical downlink control channel (PDCCH) monitoring enhancements and/or connected mode discontinuous reception (C-DRX) enhancements.

In recent studies in 3GPP, under objectives of XR-awareness in a radio access network (RAN), uplink (UL) and downlink (DL) XR service traffic characteristics, QoS metrics, and/or application layer attributes are identified as beneficial to a base station, which may be used for XR service specific traffic handling.

In some embodiments, an example of the XR service specific traffic handling may include a buffer status reporting (BSR) procedure that is used by a user equipment (UE) to provide information about an amount of data that the UE would like to send to a base station in the UL direction. Based on the amount of data pending at the UE for transmission in the UL direction, via a physical uplink shared channel (PUSCH), the base station may allocate a minimum amount of UL grant, based on availability of the PUSCH resource in terms of resource blocks (RBs).

In some embodiments, the BSR procedure may use a 5-bit or 8-bit buffer size field to inform the base station about the amount of data for which the UE is requesting an UL grant from the base station. The buffer size field of 5-bits may be used as described in Table 6.1.3.1-1 of 3GPP Technical Specification (TS) 38.321, and the buffer size field of 8-bits may be used as described in Table 6.1.3.1-2 of 3GPP TS 38.321. The buffer size field may identify a total amount of data for PUSCH transmission as calculated based on the data volume calculation procedure described in 3GPP TS 38.322 and 3GPP TS 38.323. The total amount of data may correspond with data across all logical channels (LCHs) of an LCH group after a media access controller (MAC) protocol data unit (PDU) is built. By way of a non-limiting example, after an LCH prioritization procedure, a value of the buffer size field may be zero. In some embodiments, the amount of data may be indicated in a number of bytes. The 5-bits buffer size field may correspond with a short BSR format or a short truncated BSR format, and the 8-bits buffer size field may correspond with a long BSR format or a long truncated BSR format.

In some embodiments, for the long BSR format and/or the long truncated BSR format, the buffer size fields may be included in an ascending order based on the logical channel group (LCG) index. By way of a non-limiting example, for the long truncated BSR format, the number of buffer size fields included in an SR may be maximized without exceeding the number of padding bits.

In some embodiments, in a pre-emptive BSR procedure, the buffer size field may identify a total amount of data expected to arrive at an integrated access and backhaul mobile termination (IAB-MT) where the pre-emptive BSR procedure is triggered. The total amount of data expected to arrive at the IAB-MT may not include a volume of data currently available in the IAB-MT. In some embodiments, the pre-emptive BSR format may be identical to the long BSR format bit that uses 8-bits of buffer field.

Accordingly, various embodiments described herein may provide solutions for SR indication, SR indication optimization using, for example, SR multiplexing, payload concatenation, and so on. In some embodiments, a single SR (or an integrated SR) may be generated from a plurality of SRs corresponding to one or more LCHs and/or one or more flows (e.g., call flows, or QoS flows).

Reference will now be made in detail to representative embodiments/aspects illustrated in the accompanying drawings. The following description is not intended to limit the embodiments to one preferred embodiment. On the contrary, it is intended to cover alternatives, combinations, modifications, and equivalents as can be included within the spirit and scope of the described embodiments as defined by the appended claims.

FIG. 1 shows an example wireless communication system, according to embodiments described herein. As shown in FIG. 1, a wireless communication system 100 may include base stations 102 and 104 and a UE 106. In some embodiments, the base stations 102 and/or 104 may be an eNb, an eNodeB, a gNodeB, or an access point (AP) in a RAN and may support one or more radio access technologies, such as 4G, 5G, 5G new radio (5G NR), and so on. The UE 106 may be a phone, a smart phone, a tablet, a smartwatch, an Internet-of-Things (IoT) device, a vehicle, and so on.

In some embodiments, the UE 106 may have data associated with flows related to XR service to be sent in the UL direction using PUSCH. The UE may therefore send an SR for allocating one or more RBs corresponding to the amount of the data associated with the flows related to the XR service to be sent in the UL direction for an LCH or an LCG. The amount of the data to be sent in the UL direction for which RBs are requested from the base station 102 or 104 may be indicated using one or more bits. By way of a non-limiting example, a 5-bit or 8-bit buffer size field, as described herein, may be used for SR indication in some XR service scenarios.

By way of a non-limiting example, the UE 106 may have data related to XR service traffic corresponding to an audio stream and/or a data stream of a constant-bit rate. The UE 106 may, therefore, use a single-bit SR buffer size field for an SR indication. Similarly, for XR service traffic corresponding to a pause/control stream, which may be of a constant-bit rate, the UE 106 may use a single-bit SR buffer size field for an SR indication. Upon receiving a single-bit SR indication, the base station may allocate RBs corresponding to a predetermined number of bytes of data to be sent in the UL direction. The predetermined number of bytes of data may be determined according to the constant-bit rate consistent with the type of XR service traffic such as the audio stream, the data stream, the pause/control stream, and/or other constant-bit rate streams or scenarios.

However, XR service traffic related to a video stream may have a variable-bit rate, and the UE 106 may therefore use more than one bit, for example, 5-bits or 8-bits, in an SR indication. Further, the XR service traffic related to the video stream may follow a distribution of data, for example, according to a truncated Gaussian distribution format, an SR indication may be optimized by indicating the buffer data size as a quantized buffer data size. The buffer data size may be quantized using a uniform quantizer and/or a non-uniform quantizer.

In some embodiments, the uniform quantizer may be based on a buffer data size associated with an SR configuration. For example, in an SR indication using 2-bits to communicate buffer data size, a value "00" may be used for a buffer data size between [μ−σ/2, μ+σ/2], a value "01" may be used for a buffer data size between [1, μ−σ/2], a value "10" may be used for a buffer data size between [μ+σ/2, 1], and so on. Here, μ and σ may be configured in an SR configuration.

In some embodiments, the non-uniform quantizer may be based on a quantization step that is specified by the base station 102 or 104 to the UE 106 in a radio resource control (RRC) signaling and/or media access controller (MAC) control element (MAC CE). Accordingly, as described herein, in accordance with some embodiments, an SR indication may be optimized. Further improvements or enhancements corresponding to the SR indication with respect to multiple SR indications associated with various call flows and/or data associated with different priorities are described below in reference to FIG. 2.

Figure 2:
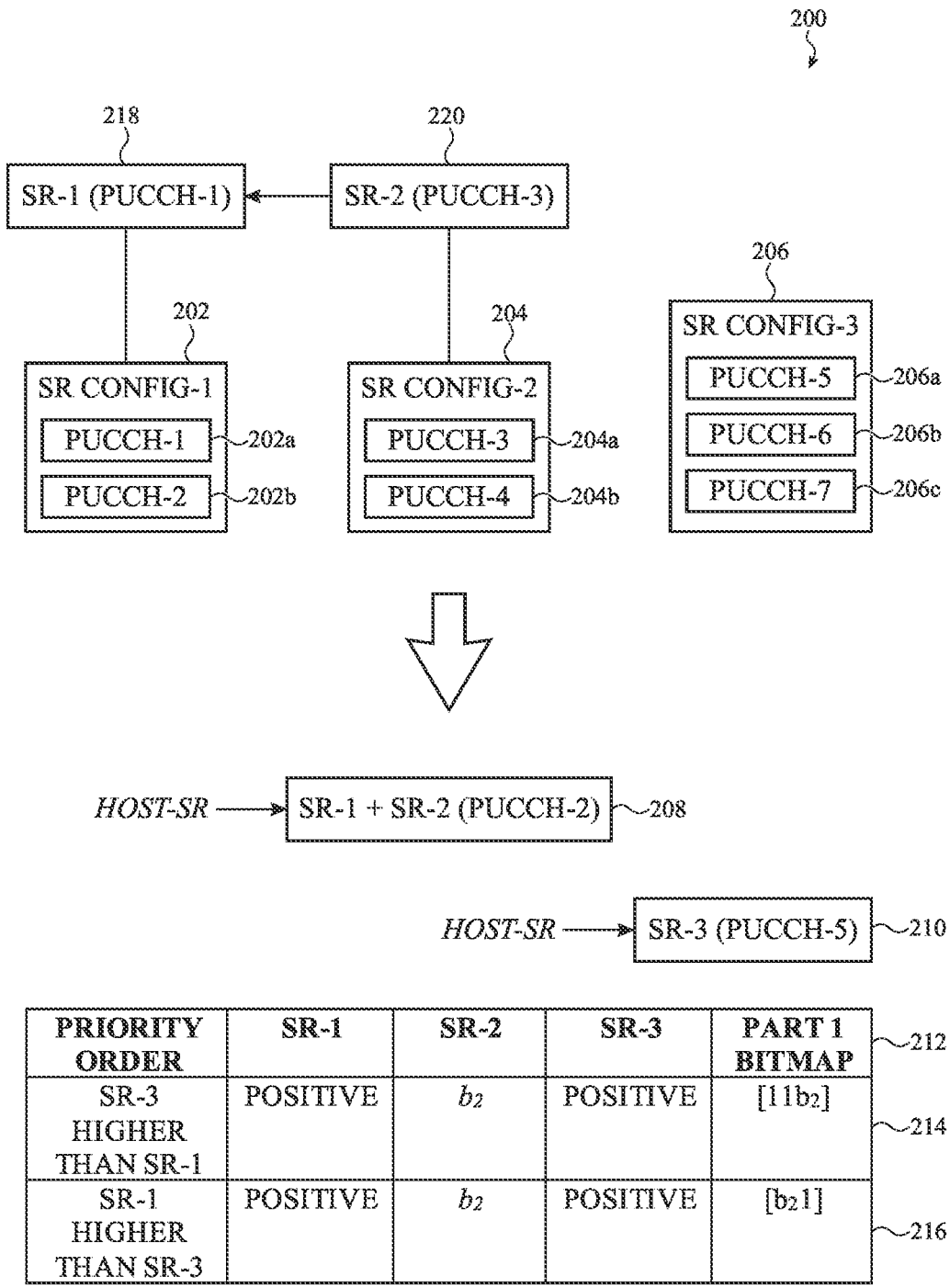
FIG. 2 illustrates an example SR multiplexing, according to embodiments described herein.

FIG. 2 illustrates an example SR multiplexing, according to embodiments described herein. In some embodiments, a physical uplink control channel (PUCCH) resource set or a PUCCH resource list may be used for an SR. As described herein, different flows may be associated with different SRs. Each SR of the different SRs may thus be associated with a different amount of data or payload size. Further, the UE may have data to be sent in the UL direction associated with one or more different flows, such as data flows, call flows, and/or QoS flows.

In some embodiments, the UE 106 may send an SR based on an SR configuration that is associated with an XR service scenario and/or a flow, such as a data flow, a call flow, and/or a QoS flow. The SR configuration may be associated with the PUCCH resource list including one or more PUCCH resources. A PUCCH resource from the PUCCH resource list may be selected based on the payload size. For example, as shown in diagram 200, SR configurations SR Config-1 202 and SR-Config-2 204 may be configured at the UE 106 by the base station 102 or 104. By way of a non-limiting example, the SR Config-1 202 may include a PUCCH resource list including PUCCH resources PUCCH-1 202a and PUCCH-2 202b. Similarly, he SR Config-2 may include a PUCCH resource list including PUCCH resource PUCCH-3 204a and PUCCH-4 204b. The UE may select a PUCCH resource according to the payload size from an SR Config that corresponds with the flow or the XR service scenario corresponding to the data to be sent in the UL direction.

As described herein, the data to be sent in the UL direction may be associated with different XR service scenarios. Accordingly, the data to be sent in the UL direction may have a different priority; some data may have a higher priority in comparison with other data. In some embodiments, the UE may send an SR for only higher priority data, and drop an SR for lower priority data.

In some embodiments, when the UE 106 has data associated with different priorities or flows to be sent in the UL direction or, in other words, where there is a collision between SRs associated with data of different priorities or flows to be sent to the base station 102 or 104, an SR may be selected based on a priority associated with a corresponding SR configuration. Additionally, or alternatively, a priority associated with a PUCCH resource of a PUCCH resource list of the SR configuration may be used to select a PUCCH resource for the SR. By way of a non-limiting example, the priority may be determined based on a schedulingRequestID.

In some embodiments, multiple SRs may be multiplexed and an integrated SR (or a single SR) may be generated and transmitted by the UE 106 to the base station 102 or 104. For example, based on the flow and/or the payload size, the UE may have two SRs, SR-1 218 and SR-2 220, in which the UE may have selected PUCCH resources, the PUCCH-1 202a and the PUCCH-3 204a, respectively. The UE may generate the integrated SR 208 in which the UE 106 may select a PUCCH resource PUCCH-2 202b for the integrated SR 208. Thus, the UE may send the integrated SR 208 instead of two separate SRs 218 and 220. Even though the present disclosure describes multiplexing two SRs into an integrated SR, more than two SRs may be multiplexed into an integrated SR.

In some embodiments, when multiple SRs are multiplexed into an integrated SR, payload or data corresponding to each SR of the multiple SRs integrated into the integrated SR may be concatenated according to a particular criterion, for example, an ascending or descending order of a schedulingRequestId of an SR, or a host SR's schedulingRequestId. As described herein, SRs 218 and 220 are integrated into the integrated SR 208, which includes a PUCCH resource PUCCH-2 202b, and the SR-1 218 is the host SR of the integrated SR.

In some embodiments, when the payload from multiple SRs are concatenated as described herein, depending on whether a positive SR-1, a positive SR-2, and/or a positive integrated SR are generated, for the same PUCCH resource, the payload size may be different. However, to avoid the base station from having to take extra steps to determine the payload size for the same PUCCH resource, a base station blind detection technique may be used. In one example, the base station blind detection technique may use a base station configuration. Additionally, or alternatively, an SR (for example, the integrated SR) may be split into two parts. By way of a non-limiting example, splitting of the SR into two parts may be performed in a similar way that channel state information (CSI) is split into two parts.

In some embodiments, a first part of the SR split into two parts may include a bitmap indicating a presence or absence of an SR, and a second part of the SR split into two parts may include concatenated payloads of each SR associated with the integrated SR. For example, a bitmap value "10" may indicate a presence of SR-1 alone, a bitmap value "11" may indicate a presence of both SR-1 and SR-2, and so on.

In the diagram 200, an SR Config-3 206 including a PUCCH resource list of PUCCH resources PUCCH-5 206a, PUCCH-6 206b, and PUCCH-7 206c is also shown. Based on the flow and/or the XR service scenario, and a payload size, the UE 106 may select the PUCCH resource PUCCH-5 206a for an SR SR-3 210, which has a host-SR of SR-3 as described herein as a PUCCH resource used for this SR belonging to the SR Config-3 206 of SR-3 210.

Accordingly, in some embodiments, when the UE 106 multiplexes multiple SRs, the UE may multiplex SRs in multiple stages. For example, in a first stage the SR-1 218 and the SR-2 220 may be multiplexed into the integrated SR 208, and then subsequently the SR-3 210 may also be multiplexed with the SR-1 218 and the SR-2 220 into the integrated SR. Accordingly, an order of multiplexing, e.g., the multiplexing history of the SRs, may be presented using a bitmap for the two-part SR. For example, the multiplexing history of the SRs may be presented in the bitmap using a priority of the host-SR. For example, a first part of the two-part SR 212 may be represented in a bitmap as [11b2] 214 when a priority associated with the SR-3 210 is higher than the priority associated with the host SR SR-1 218, or [1b21] 216 when a priority associated with a host SR SR-1 218 is higher than the priority associated with the host SR SR-3 210.

Accordingly, as described herein in accordance with some embodiments, in addition to 1-bit SR, an SR may use multiple bits (e.g., 2 or more bits) to report a finer granularity or additional information corresponding to LCHs or an LCG associated with an SR. Using multiple bits for the SR may require additional changes at a physical (PHY) layer.

Additionally, or alternatively, multiple SRs may be mapped as a group to construct a composite SR (e.g., a single SR or an integrated SR). Each SR mapped to the integrated SR may be an SR of 1-bit, and the integrated SR may convey more information by extending the number of bits from each 1-bit SR.

In some embodiments, and by way of a non-limiting example, a group of 1-bit SRs (e.g., an integrated SR) may be associated with the same LCH or LCG, and a different SR of the group of 1-bit SRs may be associated with a different priority, a different XR service traffic stream, and/or a different QoS flow, thereby allowing for more fine-granular prioritization and/or identification/association of XR service traffic streams, and improving resource allocation. For example, a group of SRs may be linked with an LCH that is associated with multiple QoS flows, and each QoS flow may use its own SR. Further, an SR priority per LCH or LCG may be allocated by a network in such a way that an LCH or LCG with sub-flows that require further prioritization can utilize a separate SR resource per sub-flow. In some embodiments, a table describing mapping of a QoS flow to an SR may be used as configured by a network and/or a base station. FIG. 3 through FIG. 7 describe such mapping of QoS flows to an LCH and a corresponding integrated SR based on various sub-flows of each individual SR of the integrated SR.

Figure 3:
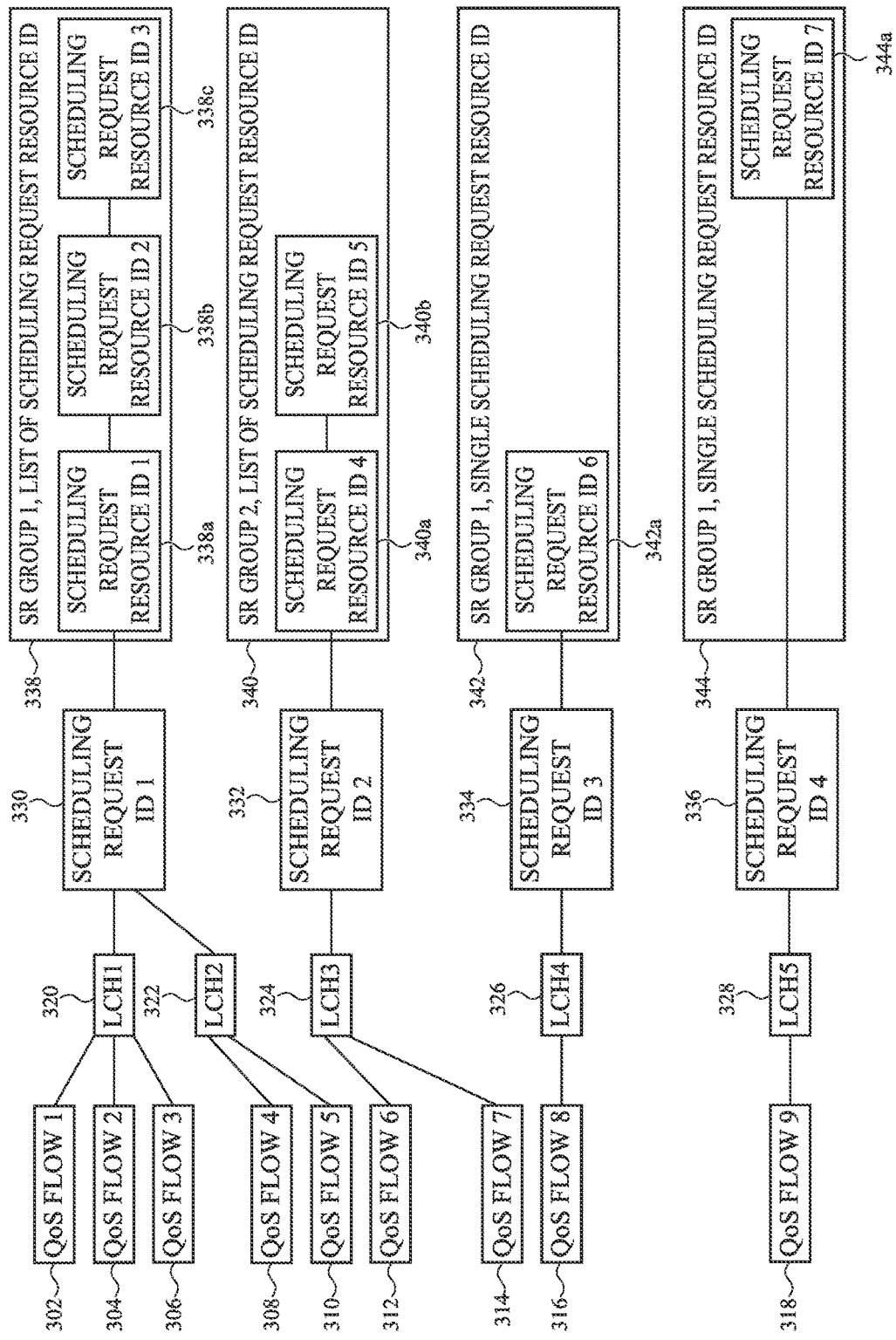
FIG. 3 illustrates a first example mapping of quality of service (QoS) flows to a logical channel (LCH) and a corresponding integrated SR based on various sub-flows of each individual SR of the integrated SR, according to embodiments described herein.

FIG. 3 illustrates a first example mapping of QoS flows to an LCH and a corresponding integrated SR based on various sub-flows of each individual SR of the integrated SR, in accordance with some embodiments. As shown in a diagram 300, various QoS flows, such as a QoS flow 1 302, a QoS flow 2 304, a QoS flow 3 306, a QoS flow 4 308, a QoS flow 5 310, a QoS flow 6 312, a QoS flow 7 314, a QoS flow 8 316, and a QoS flow 9 318, may be mapped to different LCHs. For example, the QoS flow 1 302, the QoS flow 2 304, and the QoS flow 3 306 may be mapped to an LCH LCH1 320. Similarly, the QoS flow 4 308 and the QoS flow 5 310 may be mapped to an LCH LCH2 322, and the QoS flow 6 312 and the QoS flow 7 314 may be mapped to an LCH LCH3 324. Here, the QoS flows 1-7 are sub-flows for their respective LCHs. The QoS flow 8 316 and the QoS flow 9 318 are mapped to a LCH LCH4 326 and LCH LCH5 328, as individual flows, but not as sub-flows in an SR.

As shown in the diagram 300, multiple SRs may be present based on the data to be sent in the UL direction. Accordingly, an SR scheduling request 330 may be generated by the UE that is associated with the LCH1 320 and the LCH2 322.

The scheduling request 330 may be based on multiple SRs that correspond to various sub-flows such as the QoS flow 1 302, the QoS flow 2 304, and the QoS flow 3 306 associated with the LCH LCH1 320, and the QoS flow 4 308 and the QoS flow 5 310 associated with the LCH LCH2 322. The scheduling request 330 may be identified based on an ID of a SchedulingRequestConfig that identifies a scheduling request configuration associated with the one or more LCHs of a plurality of LCHs. Further, one or more PUCCH resources included in the integrated SR 330 as SR Group 1 338 may be identified by an identification of a scheduling resource on a PUCCH configured in a PUCCH-Config, such as a schedulingRequestResourceId 1 338a, a schedulingRequestResourceId 2 338b, and a schedulingRequestResourceId 3 338c.

The scheduling request 332 may be based on multiple SRs that correspond to various sub-flows such as the QoS flow 6 312, and the QoS flow 7 314 associated with the LCH LCH3 324, and identified based on an ID of a SchedulingRequest-Config that identifies a scheduling request configuration associated with the one or more LCHs of a plurality of LCHs. Further, one or more PUCCH resources included in the integrated SR 332 as SR Group 2 340 may be identified by an identification of a scheduling resource on a PUCCH configured in a PUCCH-Config, such as a schedulingRequestResourceId 4 340a, and a schedulingRequestResourceId 5 340b.

The SR 334 and the SR 336 each may correspond to an LCH LCH4 326 and LCH LCH5 328, respectively, but are not integrated with other SRs corresponding to other flows, but rather sent as an individual SR 342 and 344, respectively, including a single PUCCH resource identified as a schedulingRequestResourceId 6 342a, and a scheduling RequestResourceId 7 344a.

In some embodiments, each QoS flow mapped to an LCH may have the same or different priority, and their corresponding SR in the integrated SR may be ordered based on the priority associated with QoS flow.

Figure 4:
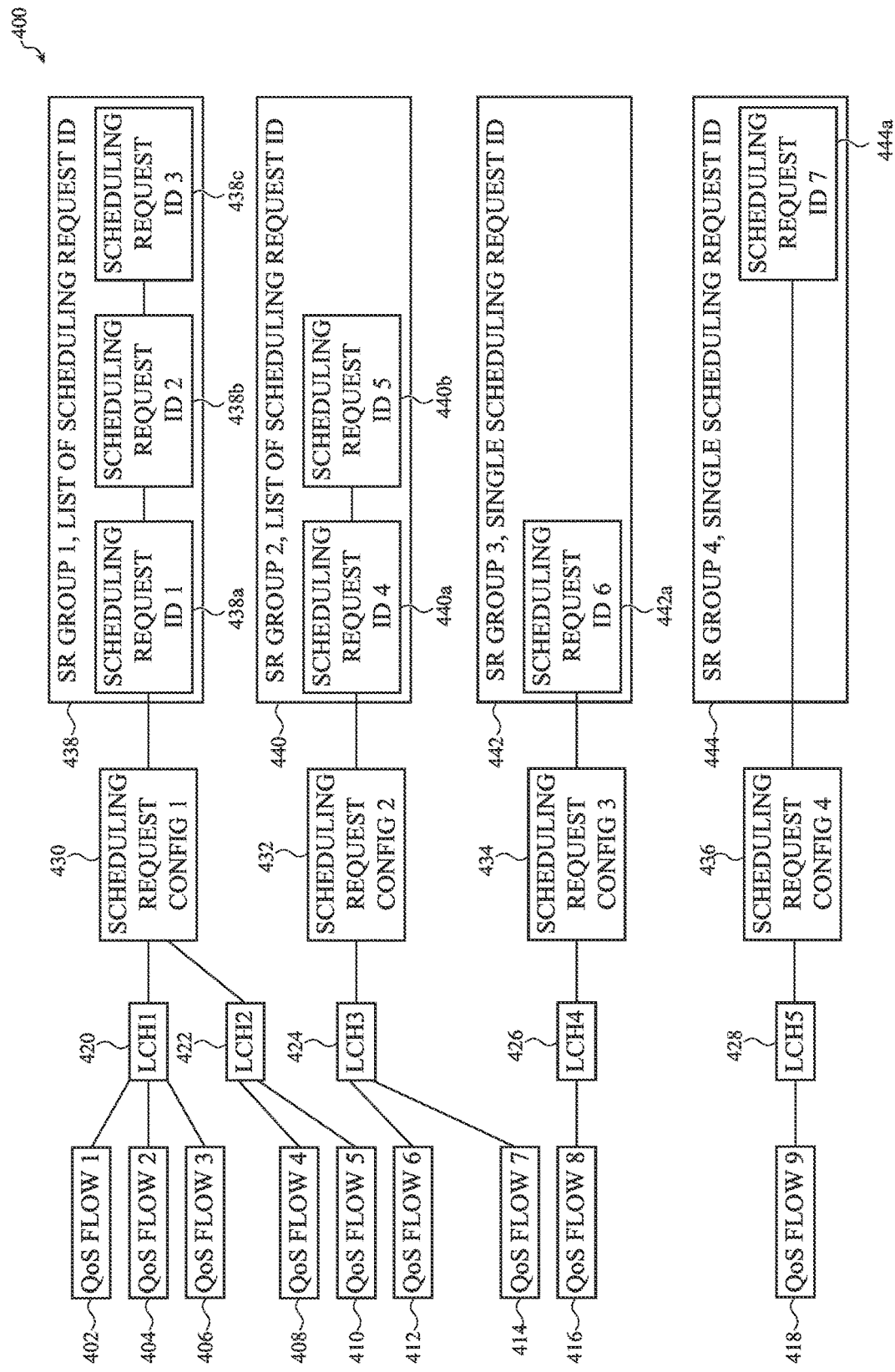
FIG. 4 illustrates a second example mapping of QoS flows to an LCH and a corresponding integrated SR based on various sub-flows of each individual SR of the integrated SR, according to embodiments described herein.

FIG. 4 illustrates a second example mapping of QoS flows to an LCH and a corresponding integrated SR based on various sub-flows of each individual SR of the integrated SR, in accordance with some embodiments. As shown in a diagram 400, various QoS flows, such as a QoS flow 1 402, a QoS flow 2 404, a QoS flow 3 406, a QoS flow 4 408, a QoS flow 5 410, a QoS flow 6 412, a QoS flow 7 414, a QoS flow 8 416, and a QoS flow 9 418, may be mapped to different LCHs. For example, the QoS flow 1 402, the QoS flow 2 404, and the QoS flow 3 406 may be mapped to an LCH LCH1 420. Similarly, the QoS flow 4 408 and the QoS flow 5 410 may be mapped to an LCH LCH2 422, and the QoS flow 6 412 and the QoS flow 7 414 may be mapped to an LCH LCH3 424. Here, the QoS flows 1-7 are sub-flows for their respective LCHs. The QoS flow 8 416 and the QoS flow 9 418 are mapped to a LCH LCH4 426 and a LCH LCH5 428, respectively, as individual flows, but not as sub-flows in an SR.

As shown in the diagram 400, multiple SRs may be present based on the data to be sent in the UL direction. Accordingly, an SR scheduling request 430 may be generated by the UE that is associated with the LCH1 420 and the LCH2 422.

The scheduling request 430 may be based on multiple SRs that correspond to various sub-flows such as the QoS flow 1 402, the QoS flow 2 404, and the QoS flow 3 406 associated with the LCH LCH1 420, and the QoS flow 4 408 and the QoS flow 5 410 associated with the LCH LCH2 422. The scheduling request 430 may be identified based on a SchedulingRequestConfig identifying dedicated SR resource configured via MAC-CellGroupConfig associated with the one or more LCHs of a plurality of LCHs. Further, one or more PUCCH resources included in the integrated SR 430 as SR Group 1 438 may be identified by an identification of an SR configuration to which a logical channel is mapped, such as a schedulingRequestId 1 438a, a schedulingRequestId 2 438b, and a schedulingRequestId 3 438c.

The scheduling request 432 may be based on multiple SRs that correspond to various sub-flows such as the QoS flow 6 412, and the QoS flow 7 414 associated with the LCH LCH3 424, and identified based on an ID of a SchedulingRequest-Config identifying a dedicated SR resource configured via MAC-CellGroupConfig associated with the one or more LCHs of a plurality of LCHs. Further, one or more PUCCH resources included in the integrated SR 432 as SR Group 2 440 may be identified by an identification of an SR configuration to which a logical channel is mapped, such as a schedulingRequestId 4 440a, and a schedulingRequestId 5 440b.

The SR 434 and the SR 436 each may correspond to an LCH LCH4 426 and LCH LCH5 428, respectively, but are not integrated with other SRs corresponding to other flows, but rather sent as an individual SR 442 and 444, respectively, including a single PUCCH resource identified as a schedulingRequestId 6 442a, and a scheduling RequestId 7 444a.

In some embodiments, each QoS flow mapped to an LCH may have the same or a different priority, and their corresponding SR in the integrated SR may be ordered based on the priority associated with the QoS flow.

Figure 5:
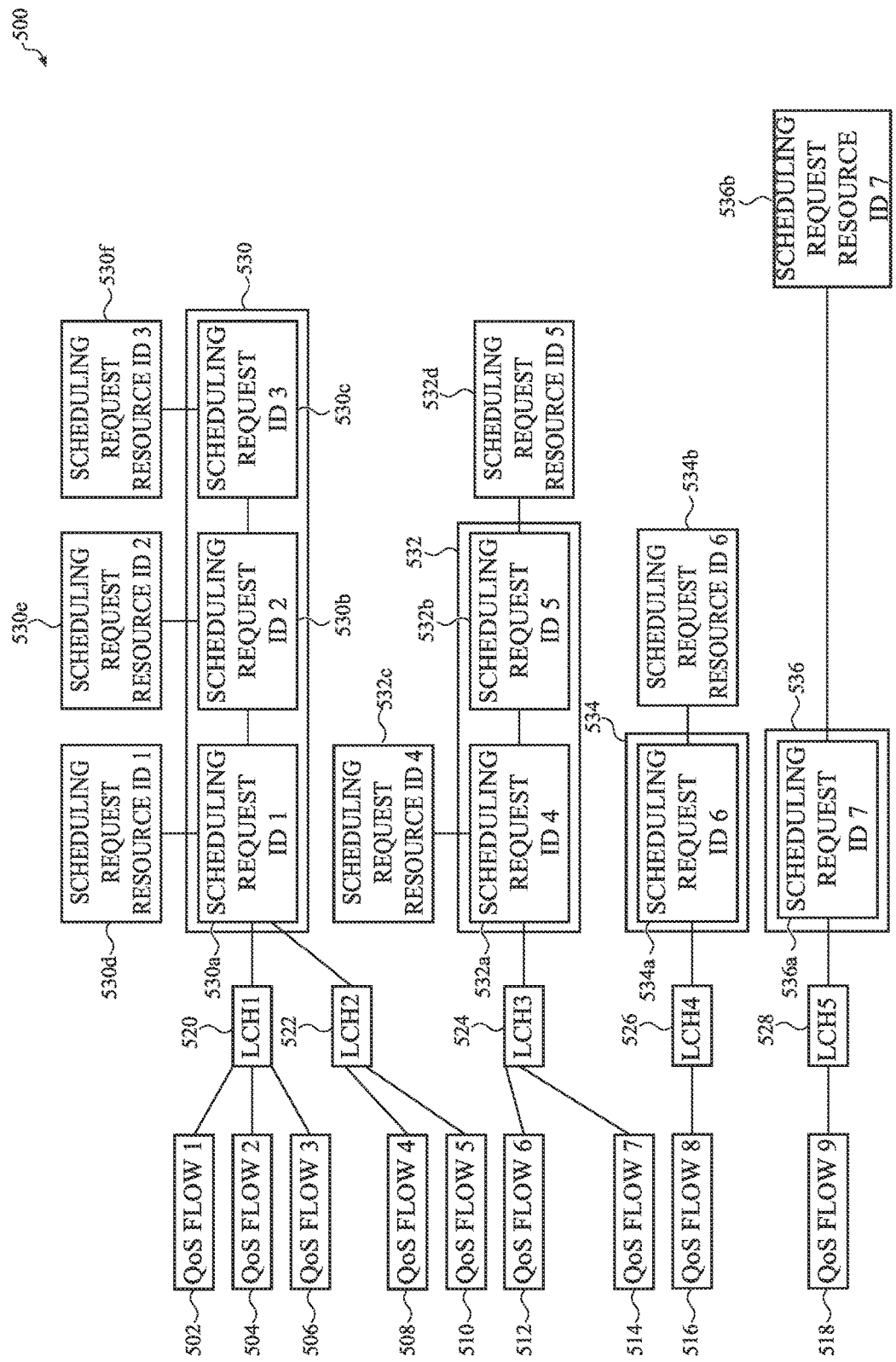
FIG. 5 illustrates a third example mapping of QoS flows to an LCH and a corresponding integrated SR based on various sub-flows of each individual SR of the integrated SR, according to embodiments described herein.

FIG. 5 illustrates a third example mapping of QoS flows to an LCH and a corresponding integrated SR based on various sub-flows of each individual SR of the integrated SR, in accordance with some embodiments. As shown in a diagram 500, various QoS flows, such as a QoS flow 1 502, a QoS flow 2 504, a QoS flow 3 506, a QoS flow 4 508, a QoS flow 5 510, a QoS flow 6 512, a QoS flow 7 514, a QoS flow 8 516, and a QoS flow 9 518, may be mapped to different LCHs. For example, the QoS flow 1 502, the QoS flow 2 504, and the QoS flow 3 506 may be mapped to an LCH LCH1 520. Similarly, the QoS flow 4 508 and the QoS flow 5 510 may be mapped to an LCH LCH2 522, and the QoS flow 6 512 and the QoS flow 7 514 may be mapped to an LCH LCH3 524. Here, the QoS flows 1-7 are sub-flows for their respective LCHs. The QoS flow 8 516 and the QoS flow 9 518 are mapped to a LCH LCH4 526 and a LCH LCH5 528, respectively, as individual flows, but not as sub-flows in an SR.

As shown in the diagram 500, multiple SRs may be present based on the data to be sent in the UL direction. Accordingly, an SR scheduling request 530 (or a group of SRs 530) may be generated by the UE that is associated with the LCH1 520 and the LCH2 522.

The scheduling request 530 may be based on multiple SRs that correspond to various sub-flows such as the QoS flow 1 502, the QoS flow 2 504, and the QoS flow 3 506 associated with the LCH LCH1 520, and the QoS flow 4 508 and the QoS flow 5 510 associated with the LCH LCH2 522. One or more PUCCH resources included in the SR 530 may be identified by a scheduling request configuration applicable to a logical channel described in LogicalChannelConfig, such as a SchedulingRequestId 1 530a, a SchedulingRequestId 2 530b, and a SchedulingRequestId 3 530c, having a corresponding mapping (e.g., 1:1 mapping) to an identification of a scheduling resource on a PUCCH configured in a PUCCH-Config, such as a SchedulingRequestResourceId 1 530d, a SchedulingRequestResourceId 2 530e, and a SchedulingRequestResouceId 3 530f, respectively.

The scheduling request 532 may be based on multiple SRs that correspond to various sub-flows such as the QoS flow 6 512, and the QoS flow 7 514 associated with the LCH LCH3 524. One or more PUCCH resources included in the SR 532 may be identified by a scheduling request configuration applicable to a logical channel described in LogicalChannelConfig, such as a SchedulingRequestId 4 532a, and a SchedulingRequestId 5 532b, having a corresponding mapping (e.g., 1:1 mapping) to an identification of a scheduling resource on a PUCCH configured in a PUCCH-Config, such as a SchedulingRequestResourceId 4 532c, and a SchedulingRequestResourceId 5 532d, respectively.

The SR 534 and the SR 536 each may correspond to an LCH LCH4 526 and LCH LCH5 528, respectively, but are not integrated with other SRs corresponding to other flows, but rather sent as an individual SR 534 and 536, respectively, including a single PUCCH resource identified by a scheduling request configuration applicable to a logical channel described in a LogicalChannelConfig, such as a SchedulingRequestId 6 534a, and a Scheduling RequestId 7 536a, respectively, and having a corresponding mapping (e.g., 1:1 mapping) to an identification of a scheduling resource on a PUCCH configured in a PUCCH-Config, such as a SchedulingRequestResourceId 6 534b and a Scheduling RequestResourceId 7 536b, respectively.

In some embodiments, each QoS flow mapped to an LCH may have the same or a different priority, and their corresponding SR in the integrated SR may be ordered based on the priority associated with QoS flow. Further, the 1:1 mapping of a PUCCH resource identified by a scheduling request configuration application to a logical channel described in a LogicalChannelConfig and an identification of a scheduling resource on a PUCCH configured in a PUCCH-Config is based on their respective priority at a PHY level.

Figure 6:
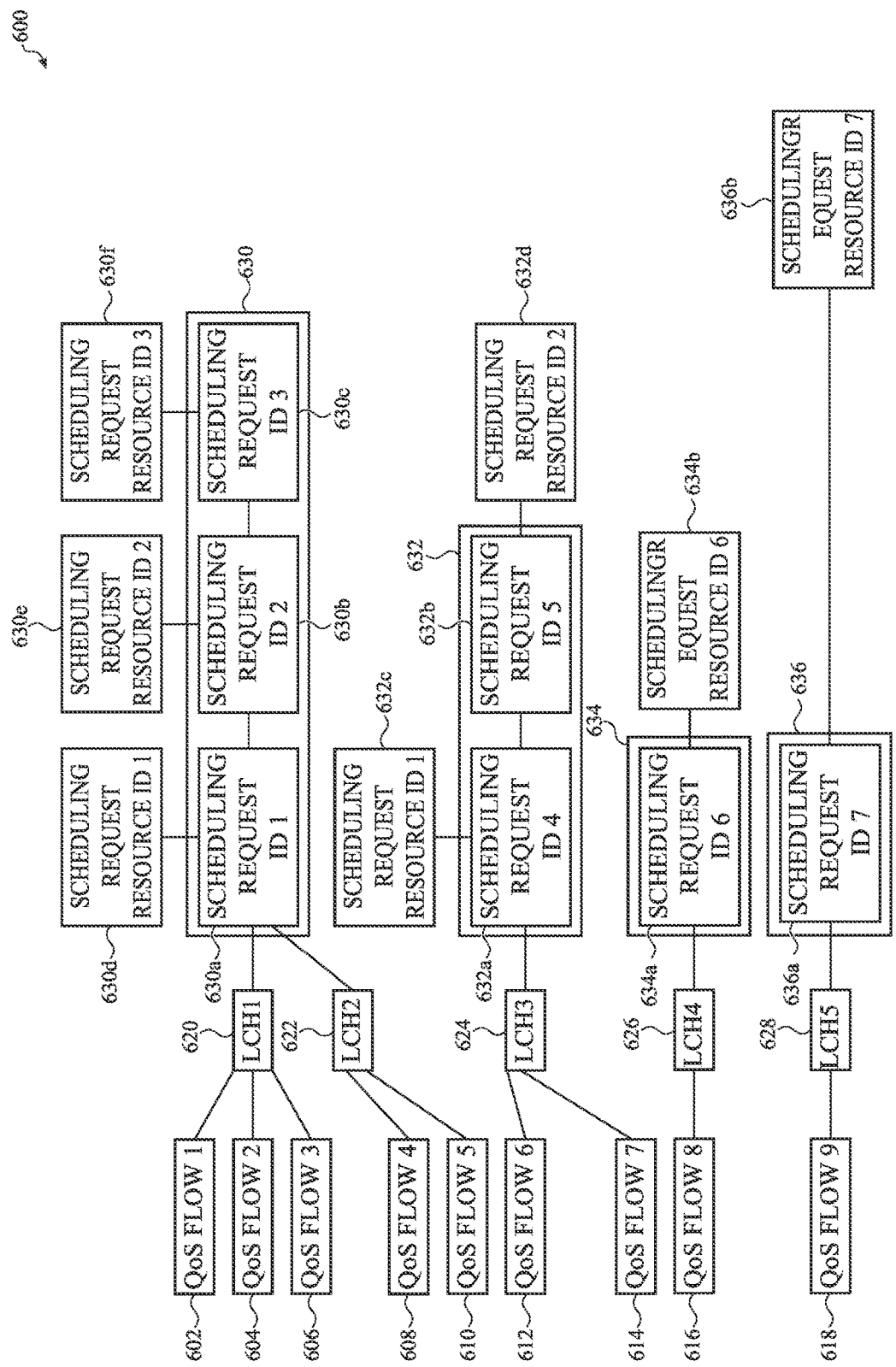
FIG. 6 illustrates a fourth example mapping of QoS flows to an LCH and a corresponding integrated SR based on various sub-flows of each individual SR of the integrated SR, according to embodiments described herein.

FIG. 6 illustrates a fourth example mapping of QoS flows to an LCH and a corresponding integrated SR based on various sub-flows of each individual SR of the integrated SR, in accordance with some embodiments. As shown in a diagram 600, various QoS flows, such as a QoS flow 1 602, a QoS flow 2 604, a QoS flow 3 606, a QoS flow 4 608, a QoS flow 5 610, a QoS flow 6 612, a QoS flow 7 614, a QoS flow 8 616, and a QoS flow 9 618, may be mapped to different LCHs. For example, the QoS flow 1 602, the QoS flow 2 604, and the QoS flow 3 606 may be mapped to an LCH LCH1 620. Similarly, the QoS flow 4 608 and the QoS flow 5 610 may be mapped to an LCH LCH2 622, and the QoS flow 6 612 and the QoS flow 7 614 may be mapped to an LCH LCH3 624. Here, the QoS flows 1-7 are sub-flows for their respective LCHs. The QoS flow 8 616 and the QoS flow 9 618 are mapped to a LCH LCH4 626 and a LCH LCH5 628, respectively, as individual flows, but not as sub-flows in an SR.

As shown in the diagram 600, multiple SRs may be present based on the data to be sent in the UL direction. Accordingly, an SR scheduling request 630 (or a group of SRs 630) may be generated by the UE that is associated with the LCH1 620 and the LCH2 622.

The scheduling request 630 may be based on multiple SRs that correspond to various sub-flows such as the QoS flow 1 602, the QoS flow 2 604, and the QoS flow 3 606 associated with the LCH LCH1 620, and the QoS flow 4 608 and the QoS flow 5 610 associated with the LCH LCH2 622. One or more PUCCH resources included in the SR 630 may be identified by a scheduling request configuration applicable to a logical channel described in LogicalChannelConfig, such as a SchedulingRequestId 1 630a, a SchedulingRequestId 2 630b, and a SchedulingRequestId 3 630c, having a corresponding mapping (e.g., M:1 mapping) to an identification of a scheduling resource on a PUCCH configured in a PUCCH-Config, such as a SchedulingRequestResourceId 1 630d, a SchedulingRequestResourceId 2 630e, and a SchedulingRequestResouceId 3 630f, respectively.

The scheduling request 632 may be based on multiple SRs that correspond to various sub-flows such as the QoS flow 6 612, and the QoS flow 7 614 associated with the LCH LCH3 624. One or more PUCCH resources included in the SR 632 may be identified by a scheduling request configuration applicable to a logical channel described in LogicalChannelConfig, such as a SchedulingRequestId 4 632a and a SchedulingRequestId 5 632b, having a corresponding mapping (e.g., M:1 mapping) to an identification of a scheduling resource on a PUCCH configured in a PUCCH-Config, such as a SchedulingRequestResourceId 4 632c and a SchedulingRequestResourceId 5 632d, respectively.

The SR 634 and the SR 636 each may correspond to an LCH LCH4 626 and LCH LCH5 628, respectively, but are not integrated with other SRs corresponding to other flows, but rather sent as an individual SR 634 and 636, respectively, including a single PUCCH resource identified by a scheduling request configuration applicable to a logical channel described in a LogicalChannelConfig, such as a SchedulingRequestId 6 634a, and a Scheduling RequestId 7 636a, respectively, and having a corresponding mapping (e.g., M:1 mapping) to an identification of a scheduling resource on a PUCCH configured in a PUCCH-Config, such as a SchedulingRequestResourceId 6 634b and a SchedulingRequest-ResourceId 7 636b, respectively.

In some embodiments, each QoS flow mapped to an LCH may have the same or a different priority, and their corresponding SR in the integrated SR may be ordered based on the priority associated with QoS flow. Further, the M:1 mapping of a PUCCH resource identified by a scheduling request configuration application to a logical channel described in a LogicalChannelConfig and an identification of a scheduling resource on a PUCCH configured in a PUCCH-Config is based on their respective priority at a PHY level.

Figure 7:
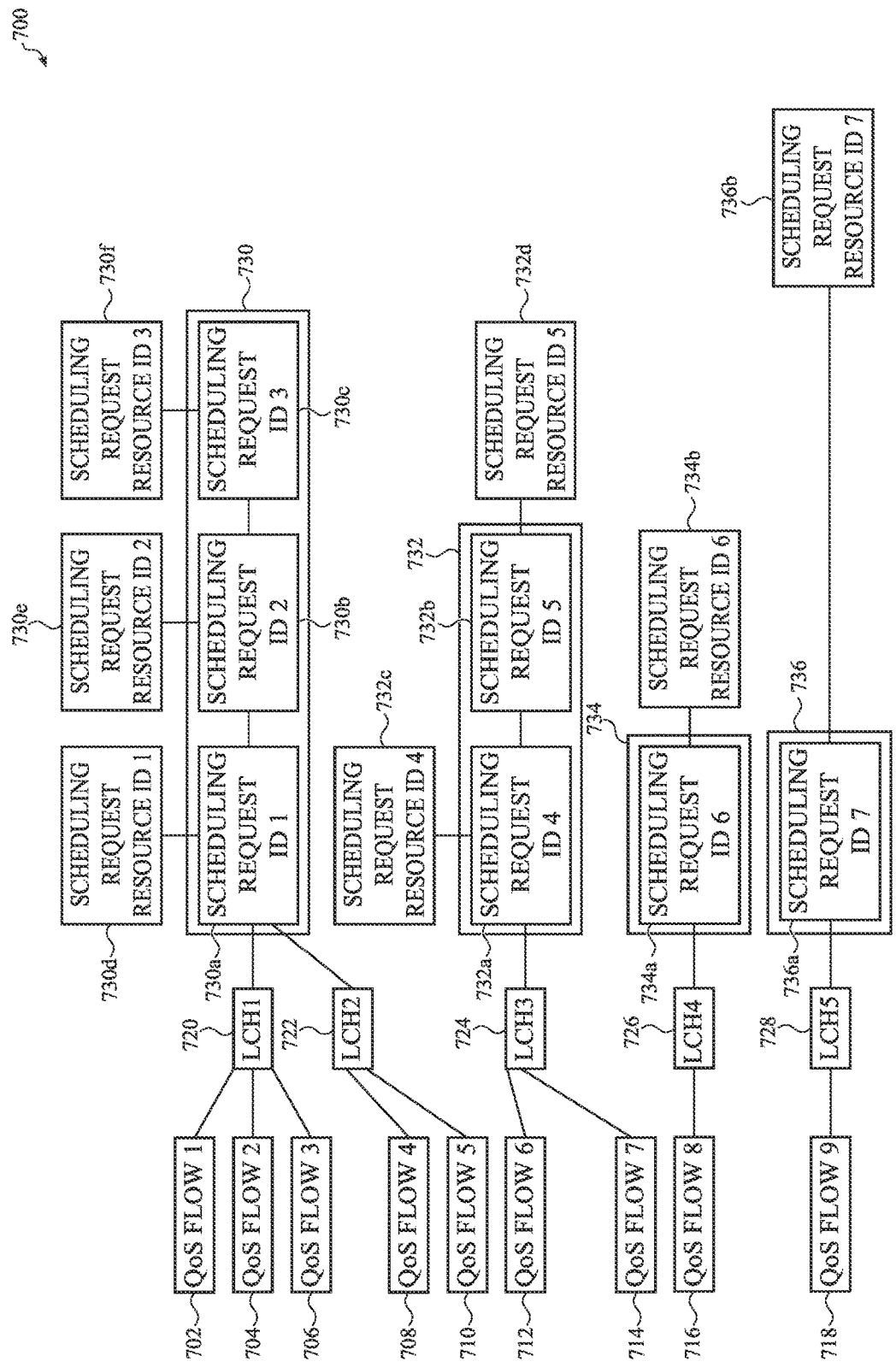
FIG. 7 illustrates a fifth example mapping of QoS flows to an LCH and a corresponding integrated SR based on various sub-flows of each individual SR of the integrated SR, according to embodiments described herein.

FIG. 7 illustrates a fifth example mapping of QoS flows to an LCH and a corresponding integrated SR based on various sub-flows of each individual SR of the integrated SR, in accordance with some embodiments. As shown in a diagram 700, various QoS flows, such as a QoS flow 1 702, a QoS flow 2 704, a QoS flow 3 706, a QoS flow 4 708, a QoS flow 5 710, a QoS flow 6 712, a QoS flow 7 714, a QoS flow 8 716, and a QoS flow 9 718, may be mapped to different LCHs. For example, the QoS flow 1 702, the QoS flow 2 704, and the QoS flow 3 706 may be mapped to an LCH LCH1 720. Similarly, the QoS flow 4 708 and the QoS flow 5 710 may be mapped to an LCH LCH2 722, and the QoS flow 6 712 and the QoS flow 7 714 may be mapped to an LCH LCH3 724. Here, the QoS flows 1-7 are sub-flows for their respective LCHs. The QoS flow 8 716 and the QoS flow 9 718 are mapped to a LCH LCH4 726 and a LCH LCH5 728, respectively, as individual flows, but not as sub-flows in an SR.

As shown in the diagram 700, multiple SRs may be present based on the data to be sent in the UL direction. Accordingly, an SR scheduling request 730 (or a group of SRs 730) may be generated by the UE that is associated with the LCH1 720 and the LCH2 722.

The scheduling request 730 may be based on multiple SRs that correspond to various sub-flows such as the QoS flow 1 702, the QoS flow 2 704, and the QoS flow 3 706 associated with the LCH LCH1 720, and the QoS flow 4 708 and the QoS flow 5 710 associated with the LCH LCH2 722. One or more PUCCH resources included in the SR 730 may be identified by a scheduling request configuration applicable to a logical channel described in a LogicalChannelConfig, such as a SchedulingRequestId 1 730a, a SchedulingRequestId 2 730b, and a SchedulingRequestId 3 730c, having a corresponding mapping (e.g., 1:1 or M:1 mapping) to an identification of a scheduling resource on a PUCCH configured in a PUCCH-Config, such as a SchedulingRequestResourceId 1 730d, a SchedulingRequestResourceId 2 730e, and a SchedulingRequestResouceId 3 730f, respectively.

The scheduling request 732 may be based on multiple SRs that correspond to various sub-flows such as the QoS flow 6 712, and the QoS flow 7 714 associated with the LCH LCH3 724. One or more PUCCH resources included in the SR 732 may be identified by a scheduling request configuration applicable to a logical channel described in LogicalChannelConfig, such as a SchedulingRequestId 4 732a, and a SchedulingRequestId 5 732b, having a corresponding mapping (e.g., 1:1 or M:1 mapping) to an identification of a scheduling resource on a PUCCH configured in a PUCCH-Config, such as a SchedulingRequestResourceId 4 732c, and a SchedulingRequestResourceId 5 732d, respectively.

The SR 734 and the SR 736 each may correspond to an LCH LCH3 726 and 728, respectively, but are not integrated with other SRs corresponding to other flows, but rather sent as an individual SR 734 and 736, respectively, including a single PUCCH resource identified by a scheduling request configuration applicable to a logical channel described in LogicalChannelConfig, such as a SchedulingRequestId 6 734a, and a SchedulingRequestId 7 736a, respectively, and having a corresponding mapping (e.g., 1:1 or M:1 mapping) to an identification of a scheduling resource on a PUCCH configured in a PUCCH-Config, such as a SchedulingRequestResourceId 6 734b and a SchedulingRequestResourceId 7 736b, respectively.

In some embodiments, each QoS flow mapped to an LCH may have the same or a different priority, and their corresponding SR in the integrated SR may be ordered based on the priority associated with QoS flow. Further, the 1:1 or M:1 mapping of a PUCCH resource identified by a scheduling request configuration application to a logical channel described LogicalChannelConfig and an identification of a scheduling resource on a PUCCH configured in a PUCCH-Config may not be based on priority linking at a PHY level.

Figure 8:
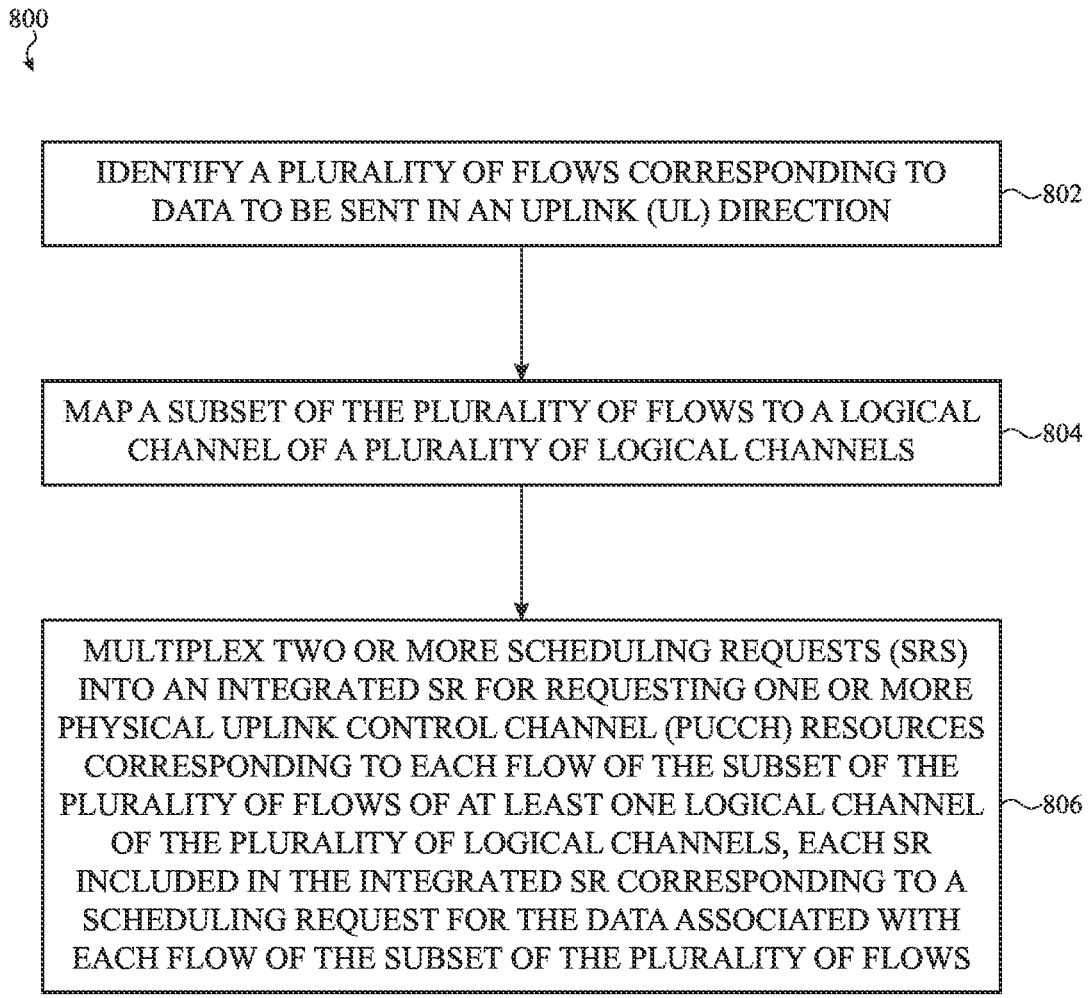
FIG. 8 illustrates an example flow-chart of operations that may be performed by a user equipment, according to embodiments described herein.

FIG. 8 illustrates an example flow-chart of operations that may be performed by a user equipment, according to embodiments described herein. As shown in the flow-chart 800, at 802, a UE may identify a plurality of flows corresponding to data to be sent in an uplink (UL) direction. As described herein, the data to be sent in the UL direction may be associated with various flows (such as various XR service traffic streams, and/or QoS flows). Accordingly, the data to be sent in the UL direction may have different priorities corresponding to their respective XR service traffic streams and/or QoS flows. By way of a non-limiting example, the term XR service in the present disclosure may be related to virtual reality and/or augmented reality, and so on.

At 804, the UE may map a subset of the plurality of flows to a logical channel of a plurality of logical channels. For example, as shown in FIG. 3 through FIG. 7, a subset of flows (e.g., the QoS flow 1, the QoS flow 2, and the QoS flow 3) of a plurality of flows (the QoS flows 1-9) may be mapped to an LCH LCH1.

At 806, the UE may multiplex two or more scheduling requests (SRs) into an integrated SR (or a composite SR) to form a group of SRs for requesting one or more physical uplink control channel (PUCCH) resources corresponding to each flow of the subset of the plurality of flows of at least one logical channel of the plurality of logical channels. Each SR included in the integrated SR may correspond to a scheduling request for the data associated with at least one flow of the subset of the plurality of flows. While multiplexing the two or more SRs into the integrated SR is described in detail with reference to various embodiments described using FIG. 3 through FIG. 7, multiplexing of the SRs is not described again for brevity.

Figure 9:
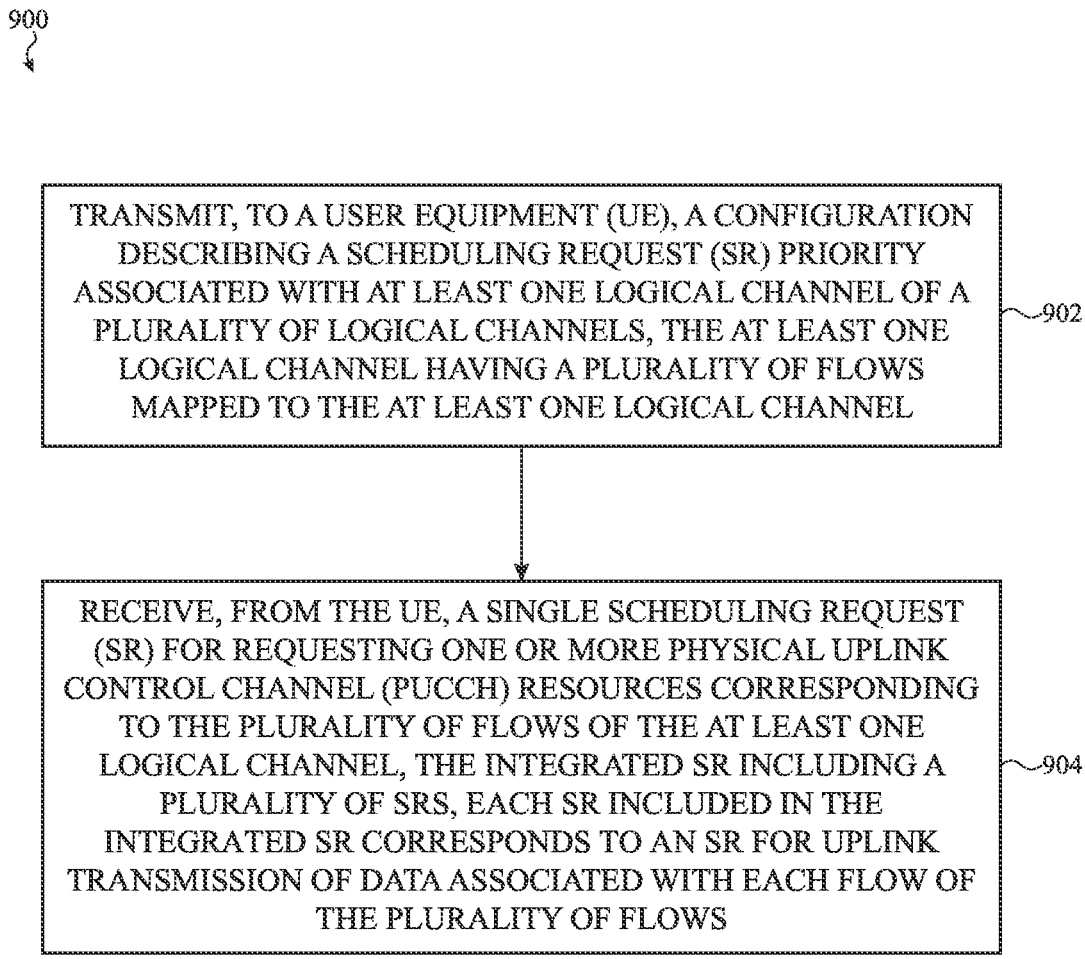
FIG. 9 illustrates an example flow-chart of operations that may be performed by a base station, according to embodiments described herein.

FIG. 9 illustrates an example flow-chart of operations that may be performed by a base station, according to embodiments described herein. As shown in the flow-chart 900, at 902, a base station may transmit, to a user equipment (UE), a configuration describing a scheduling request (SR) priority associated with at least one logical channel of a plurality of logical channels. The at least one logical channel may be associated with a plurality of flows, or one or more flows, mapped to it.

At 904, the base station may receive, from the UE, a single scheduling request (SR) (or a composite SR or an integrated SR) for requesting one or more physical uplink control channel (PUCCH) resources corresponding to the plurality of flows, or one or more flows, of the at least one logical channel. As described herein, in accordance with some embodiments, the integrated SR may include a plurality of SRs, and each SR included in the integrated SR may correspond to an SR for UL transmission of data associated with each flow of the plurality of flows. Accordingly, a first SR and a second SR included in the integrated SR may have a different priority based on their respective flow.

Thus, various embodiments described herein may provide improvement or enhancement to SR in various XR service scenarios.

Embodiments contemplated herein include one or more non-transitory computer-readable media storing instructions to cause an electronic device, upon execution of the instructions by one or more processors of the electronic device, to perform one or more elements of the method 800, or 900. In the context of method 800, this non-transitory computer-readable media may be, for example, a memory of a UE (such as a memory 1106 of a wireless device 1102 that is a UE, as described herein). In the context of method 900, this non-transitory computer-readable media may be, for example, a memory of a base station (such as a memory 1124 of a network device 1120 that is a base station, as described herein).

Embodiments contemplated herein include an apparatus having logic, modules, or circuitry to perform one or more elements of the method 800, or 900. In the context of method 800, this apparatus may be, for example, an apparatus of a UE (such as a wireless device 1102 that is a UE, as described herein). In the context of method 900, this apparatus may be, for example, an apparatus of a base station (such as a network device 1120 that is a base station, as described herein).

Embodiments contemplated herein include an apparatus having one or more processors and one or more computer-readable media, using or storing instructions that, when executed by the one or more processors, cause the one or more processors to perform one or more elements of the method 800, or 900. In the context of method 800, this apparatus may be, for example, an apparatus of a UE (such as a wireless device 1102 that is a UE, as described herein). In the context of the method 900, this apparatus may be, for example, an apparatus of a base station (such as a network device 1120 that is a base station, as described herein).

Embodiments contemplated herein include a signal as described in or related to one or more elements of the method 800, or 900.

Embodiments contemplated herein include a computer program or computer program product having instructions, wherein execution of the program by a processor causes the processor to carry out one or more elements of the method 800, or 900. In the context of method 800, the processor may be a processor of a UE (such as a processor(s) 1104 of a wireless device 1102 that is a UE, as described herein), and the instructions may be, for example, located in the processor and/or on a memory of the UE (such as a memory 1106 of a wireless device 1102 that is a UE, as described herein). In the context of method 900, the processor may be a processor of a base station (such as a processor(s) 1122 of a network device 1120 that is a base station, as described herein), and the instructions may be, for example, located in the processor and/or on a memory of the base station (such as a memory 1124 of a network device 1120 that is a base station, as described herein).

Figure 10:
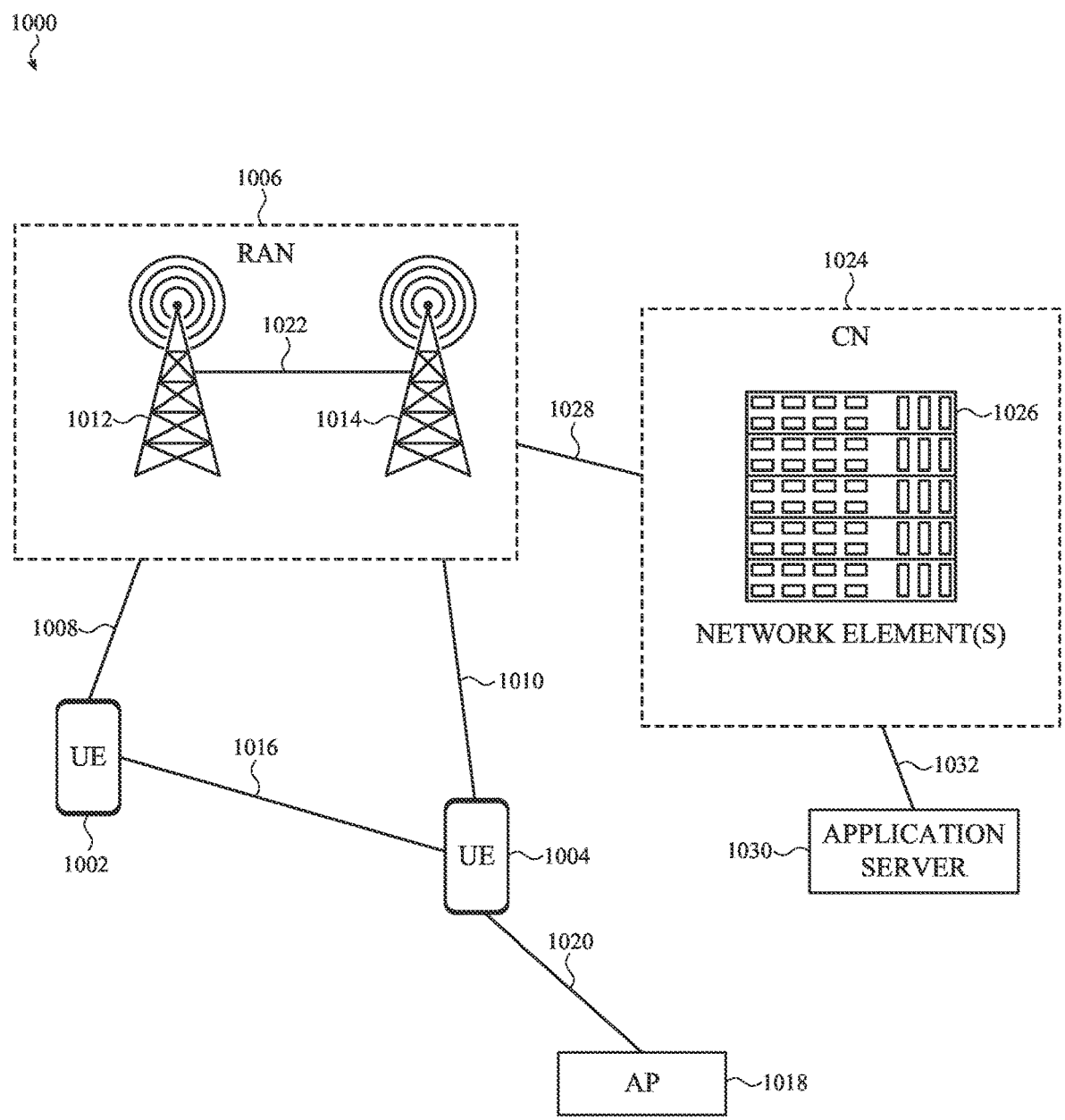
FIG. 10 illustrates an example architecture of a wireless communication system, according to embodiments described herein.

FIG. 10 illustrates an example architecture of a wireless communication system, according to embodiments described herein. The following description is provided for an example wireless communication system 1000 that operates in conjunction with the LTE system standards and/or 5G or NR system standards as provided by 3GPP technical specifications.

As shown by FIG. 10, the wireless communication system 1000 includes UE 1002 and UE 1004 (although any number of UEs may be used). In this example, the UE 1002 and the UE 1004 are illustrated as smartphones (e.g., handheld touchscreen mobile computing devices connectable to one or more cellular networks), but may also comprise any mobile or non-mobile computing device configured for wireless communication.

The UE 1002 and UE 1004 may be configured to communicatively couple with a RAN 1006. In embodiments, the RAN 1006 may be NG-RAN, E-UTRAN, etc. The UE 1002 and UE 1004 utilize connections (or channels) (shown as connection 1008 and connection 1010, respectively) with the RAN 1006, each of which comprises a physical communications interface. The RAN 1006 can include one or more base stations, such as base station 1012 and base station 1014, that enable the connection 1008 and connection 1010.

In this example, the connection 1008 and connection 1010 are air interfaces to enable such communicative coupling, and may be consistent with RAT(s) used by the RAN 1006, such as, for example, an LTE and/or NR.

In some embodiments, the UE 1002 and UE 1004 may also directly exchange communication data via a sidelink interface 1016. The UE 1004 is shown to be configured to access an access point (shown as AP 1018) via connection 1020. By way of example, the connection 1020 can comprise a local wireless connection, such as a connection consistent with any IEEE 802.11 protocol, wherein the AP 1018 may comprise a Wi-Fi® router. In this example, the AP 1018 may be connected to another network (for example, the Internet) without going through a CN 1024.

In embodiments, the UE 1002 and UE 1004 can be configured to communicate using orthogonal frequency division multiplexing (OFDM) communication signals with each other or with the base station 1012 and/or the base station 1014 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 1012 or base station 1014 may be implemented as one or more software entities running on server computers as part of a virtual network. In addition, or in other embodiments, the base station 1012 or base station 1014 may be configured to communicate with one another via interface 1022. In embodiments where the wireless communication system 1000 is an LTE system (e.g., when the CN 1024 is an EPC), the interface 1022 may be an X2 interface. The X2 interface may be defined between two or more base stations (e.g., two or more eNBs and the like) that connect to an EPC, and/or between two eNBs connecting to the EPC. In embodiments where the wireless communication system 1000 is an NR system (e.g., when CN 1024 is a 5GC), the interface 1022 may be an Xn interface. The Xn interface is defined between two or more base stations (e.g., two or more gNBs and the like) that connect to the 5GC, between a base station 1012 (e.g., a gNB) connecting to the 5GC and an eNB, and/or between two eNBs connecting to the 5GC (e.g., CN 1024).

The RAN 1006 is shown to be communicatively coupled to the CN 1024. The CN 1024 may comprise one or more network elements 1026, which are configured to offer various data and telecommunications services to customers/subscribers (e.g., users of UE 1002 and UE 1004) who are connected to the CN 1024 via the RAN 1006. The components of the CN 1024 may be implemented in one physical device or separate physical devices including components to read and execute instructions from a machine-readable or computer-readable medium (e.g., a non-transitory machine-readable storage medium).

In embodiments, the CN 1024 may be an EPC, and the RAN 1006 may be connected with the CN 1024 via an S1 interface 1028. In embodiments, the S1 interface 1028 may be split into two parts, an S1 user plane (S1-U) interface, which carries traffic data between the base station 1012 or base station 1014 and a serving gateway (S-GW), and the S1-MME interface, which is a signaling interface between the base station 1012 or base station 1014 and mobility management entities (MMEs).

In embodiments, the CN 1024 may be a 5GC, and the RAN 1006 may be connected with the CN 1024 via an NG interface 1028. In embodiments, the NG interface 1028 may be split into two parts, an NG user plane (NG-U) interface, which carries traffic data between the base station 1012 or base station 1014 and a user plane function (UPF), and the S1 control plane (NG-C) interface, which is a signaling interface between the base station 1012 or base station 1014 and access and mobility management functions (AMFs).

Generally, an application server 1030 may be an element offering applications that use internet protocol (IP) bearer resources with the CN 1024 (e.g., packet switched data services). The application server 1030 can also be configured to support one or more communication services (e.g., VoIP sessions, group communication sessions, etc.) for the UE 1002 and UE 1004 via the CN 1024. The application server 1030 may communicate with the CN 1024 through an IP communications interface 1032.

Figure 11:
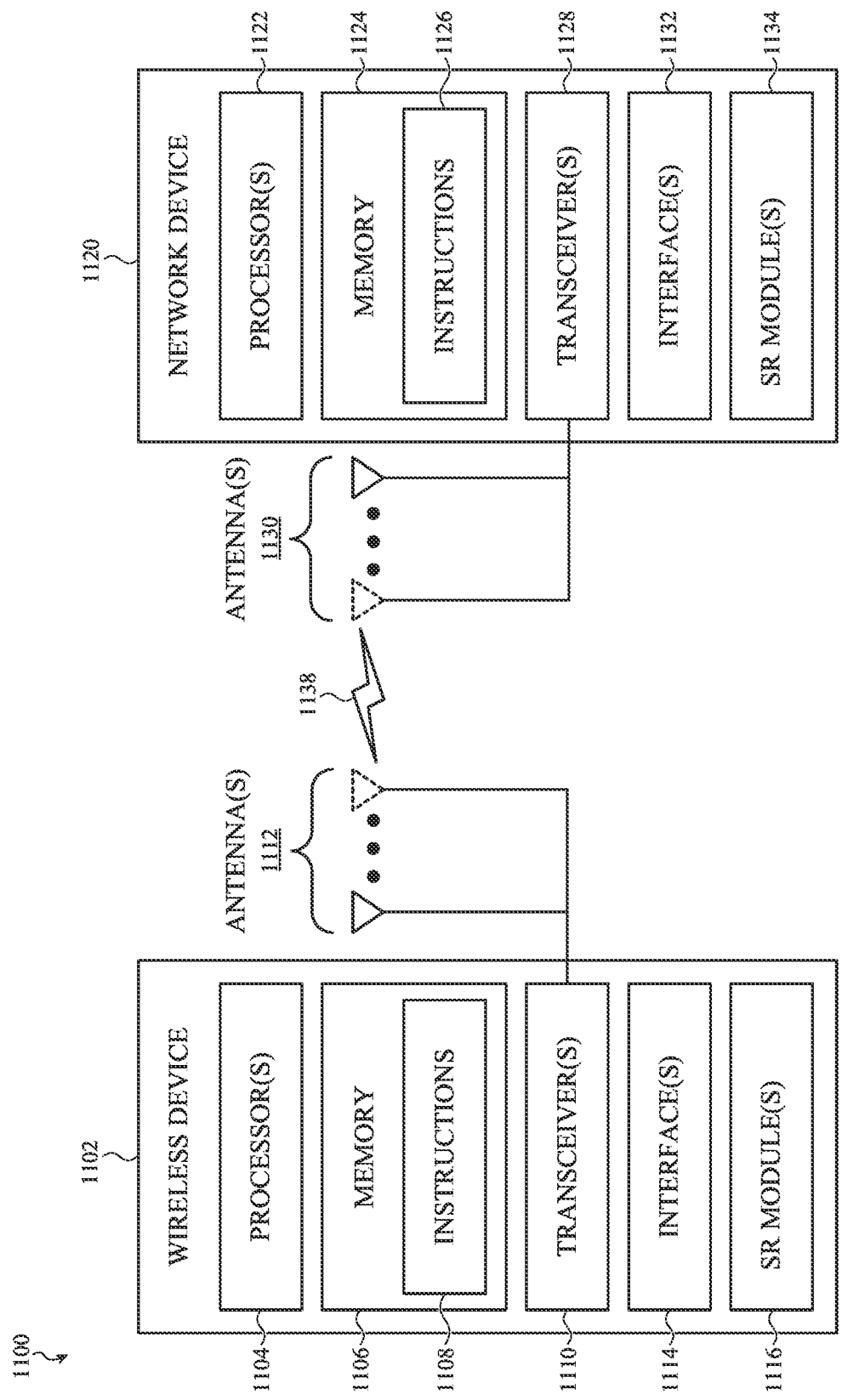
FIG. 11 illustrates a system for performing signaling between a wireless device and a network device, according to embodiments described herein.

FIG. 11 illustrates a system 1100 for performing signaling 1138 between a wireless device 1102 and a network device 1120, according to embodiments described herein. The system 1100 may be a portion of a wireless communication system as herein described. The wireless device 1102 may be, for example, a UE of a wireless communication system. The network device 1120 may be, for example, a base station (e.g., an eNB or a gNB) of a wireless communication system.

The wireless device 1102 may include one or more processor(s) 1104. The processor(s) 1104 may execute instructions such that various operations of the wireless device 1102 are performed, as described herein. The processor(s) 1104 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1102 may include a memory 1106. The memory 1106 may be a non-transitory computer-readable storage medium that stores instructions 1108 (which may include, for example, the instructions being executed by the processor(s) 1104). The instructions 1108 may also be referred to as program code or a computer program. The memory 1106 may also store data used by, and results computed by, the processor(s) 1104.

The wireless device 1102 may include one or more transceiver(s) 1110 that may include radio frequency (RF) transmitter and/or receiver circuitry that use the antenna(s) 1112 of the wireless device 1102 to facilitate signaling (e.g., the signaling 1138) to and/or from the wireless device 1102 with other devices (e.g., the network device 1120) according to corresponding RATs.

The wireless device 1102 may include one or more antenna(s) 1112 (e.g., one, two, four, or more). For embodiments with multiple antenna(s) 1112, the wireless device 1102 may leverage the spatial diversity of such multiple antenna(s) 1112 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1102 may be accomplished according to precoding (or digital beamforming) that is applied at the wireless device 1102 that multiplexes the data streams across the antenna(s) 1112 according to known or assumed channel characteristics such that each data stream is received with an appropriate signal strength relative to other streams and at a desired location in the spatial domain (e.g., the location of a receiver associated with that data stream). Some embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In some embodiments having multiple antennas, the wireless device 1102 may implement analog beamforming techniques, whereby phases of the signals sent by the antenna(s) 1112 are relatively adjusted such that the (joint) transmission of the antenna(s) 1112 can be directed (this is sometimes referred to as beam steering).

The wireless device 1102 may include one or more interface(s) 1114. The interface(s) 1114 may be used to provide input to or output from the wireless device 1102. For example, a wireless device 1102 that is a UE may include interface(s) 1114 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1110/antenna(s) 1112 already described) that allow for communication between the UE and other devices and may operate according to known protocols (e.g., Wi-Fi®, Bluetooth®, and the like).

The wireless device 1102 may include an SR module 1116. The SR module 1116 may be implemented via hardware, software, or combinations thereof. For example, the SR module 1116 may be implemented as a processor, circuit, and/or instructions 1108 stored in the memory 1106 and executed by the processor(s) 1104. In some examples, the SR module 1116 may be integrated within the processor(s) 1104 and/or the transceiver(s) 1110. For example, the SR module 1116 may be implemented by a combination of software components (e.g., executed by a DSP or a general processor) and hardware components (e.g., logic gates and circuitry) within the processor(s) 1104 or the transceiver(s) 1110.

The SR module 1116 may be used for various aspects of the present disclosure, for example, aspects of FIGS. 1-9, from the UE perspective.

The network device 1120 may include one or more processor(s) 1122. The processor(s) 1122 may execute instructions such that various operations of the network device 1120 are performed, as described herein. The processor(s) 1122 may include one or more baseband processors implemented using, for example, a CPU, a DSP, an ASIC, a controller, an FPGA device, another hardware device, a firmware device, or any combination thereof configured to perform the operations described herein.

The network device 1120 may include a memory 1124. The memory 1124 may be a non-transitory computer-readable storage medium that stores instructions 1126 (which may include, for example, the instructions being executed by the processor(s) 1122). The instructions 1126 may also be referred to as program code or a computer program. The memory 1124 may also store data used by, and results computed by, the processor(s) 1122.

The network device 1120 may include one or more transceiver(s) 1128 that may include RF transmitter and/or receiver circuitry that use the antenna(s) 1130 of the network device 1120 to facilitate signaling (e.g., the signaling 1138) to and/or from the network device 1120 with other devices (e.g., the wireless device 1102) according to corresponding RATs.

The network device 1120 may include one or more antenna(s) 1130 (e.g., one, two, four, or more). In embodiments having multiple antenna(s) 1130, the network device 1120 may perform MIMO, digital beamforming, analog beamforming, beam steering, etc., as has been described.

The network device 1120 may include one or more interface(s) 1132. The interface(s) 1132 may be used to provide input to or output from the network device 1120. For example, a network device 1120 that is a base station may include interface(s) 1132 made up of transmitters, receivers, and other circuitry (e.g., other than the transceiver(s) 1128/antenna(s) 1130 already described) that enables the base station to communicate with other equipment in a network, and/or that enables the base station to communicate with external networks, computers, databases, and the like for purposes of operations, administration, and maintenance of the base station or other equipment operably connected thereto.

The network device 1120 may include an SR module 1134. The SR module 1134 may be implemented via hardware, software, or combinations thereof. For example, the SR module 1134 may be implemented as a processor, circuit, and/or instructions 1126 stored in the memory 1124 and executed by the processor(s) 1122. In some examples, the SR module 1134 may be integrated within the processor(s) 1122 and/or the transceiver(s) 1128. For example, the SR module 1134 may be implemented by a combination of software components (e.g., executed by a DSP or a general processor) and hardware components (e.g., logic gates and circuitry) within the processor(s) 1122 or the transceiver(s) 1128.

The SR module 1134 may be used for various aspects of the present disclosure, for example, aspects of FIGS. 1-9, from a base station perspective.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form described. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

The systems described herein pertain to specific embodiments but are provided as examples. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A user equipment (UE), comprising memory coupled to:
a processor configured to:
identify a plurality of flows corresponding to data to be sent in an uplink (UL) direction;
map a subset of the plurality of flows to a logical channel of a plurality of logical channels; and
multiplex, prior to transmission, two or more scheduling requests (SRs) into an integrated SR for requesting one or more physical uplink control channel (PUCCH) resources corresponding to each flow of the subset of the plurality of flows of at least one logical channel of the plurality of logical channels, each SR included in the integrated SR corresponding to a scheduling request for the data associated with at least one flow of the subset of the plurality of flows, and a payload of each SR in the integrated SR concatenated according to a particular criterion; and a transceiver configured to transmit the integrated SR.

2. The UE of claim 1, wherein an SR included in the integrated SR carries information of 1-bit, the information corresponding to a payload size of the data associated with a flow of the subset of the plurality of flows, the flow of the subset of the plurality of flows corresponding to a stream of a constant-bit rate.

3. The UE of claim 1, wherein a first SR included in the integrated SR has a different priority from a second SR included in the integrated SR.

4. The UE of claim 1, wherein the processor is configured to select the one or more PUCCH resources for an SR included in the integrated SR in accord with each flow of the subset of the plurality of flows based on a payload size of the data associated with each flow of the subset of the plurality of flows.

5. The UE of claim 1, wherein the particular criterion comprises an ascending order of an SR identification (SR ID) of each SR configuration associated with each of the subset of the plurality of flows.

6. The UE of claim 1, wherein an SR included in the integrated SR carries information of more than one bit, the information corresponding to a payload size of the data associated with a flow of the subset of the plurality of flows, the flow of the subset of the plurality of flows corresponding to a stream of a variable-bit rate.

7. The UE of claim 1, wherein an SR included in the integrated SR is related to a flow of the subset of the plurality of flows, and the flow of the subset of the plurality of flows is related to virtual reality or augmented reality.

8. The UE of claim 1, wherein:
the one or more PUCCH resources included in the integrated SR is identified by an identification of a scheduling resource on a PUCCH configured in a PUCCH-Config; and
the integrated SR corresponds with one or more logical channels of the plurality of logical channels mapped and identified based on an ID of a SchedulingRequest-Config that identifies a scheduling request configuration associated with the one or more logical channels of the plurality of logical channels.

9. The UE of claim 1, wherein:
the one or more PUCCH resources included in the integrated SR is identified by an identification of an SR configuration to which the logical channel is mapped as described in a SchedulingRequestConfig configured in a MAC-CellGroupConfig; and
the integrated SR corresponds with one or more logical channels of the plurality of logical channels mapped and identified based on the SchedulingRequestConfig identifying a dedicated SR resource configured via the MAC-CellGroupConfig.

10. The UE of claim 1, wherein:
the one or more PUCCH resources included in the integrated SR are identified by a scheduling request configuration applicable to a logical channel described in a LogicalChannelConfig having a corresponding mapping to an identification of a scheduling resource on a PUCCH configured in a PUCCH-Config.

11. The UE of claim 10, wherein:
the identification of the scheduling resource on the PUCCH configured in the PUCCH-Config is mapped to one or more identifications of the scheduling request configuration applicable to the logical channel described in the LogicalChannelConfig.

12. The UE of claim 11, wherein the identification of the scheduling resource on the PUCCH configured in the PUCCH-Config and the one or more identifications of the scheduling request configuration applicable to the logical channel described in the LogicalChannelConfig are mapped based on a priority at a physical (PHY) layer corresponding to the identification of the scheduling resource on the PUCCH configured in the PUCCH-Config and the one or more identifications of the scheduling request configuration applicable to the logical channel described in the LogicalChannelConfig.

13. The UE of claim 11, wherein the identification of the scheduling resource on the PUCCH configured in the PUCCH-Config and the one or more identifications of the scheduling request configuration applicable to the logical channel described in the LogicalChannelConfig are mapped irrespective of a priority at a physical (PHY) layer corresponding to the identification of the scheduling resource on the PUCCH configured in the PUCCH-Config and the one or more identifications of the scheduling request configuration applicable to the logical channel described in the LogicalChannelConfig.

14. A method, comprising:
identifying a plurality of flows corresponding to data to be sent in an uplink (UL) direction;
mapping a subset of the plurality of flows to a logical channel of a plurality of logical channels; and
prior to transmission, multiplexing two or more scheduling requests (SRs) into an integrated SR for requesting one or more physical uplink control channel (PUCCH) resources corresponding to each flow of the subset of the plurality of flows of at least one logical channel of the plurality of logical channels into a group of SRs, each SR of the group of SRs corresponding to a scheduling request for the data associated with each flow of the subset of the plurality of flows, and a payload of each SR in the integrated SR concatenated according to a particular criterion.

15. The method of claim 14, wherein the multiplexing the two or more SRs into the integrated SR comprises multiplexing the two or more SRs into the integrated SR based on a respective priority corresponding to each flow of the subset of the plurality of flows.

16. The method of claim 14, wherein the one or more PUCCH resources requested using the integrated SR are selected based on a payload size of the data associated with each flow of the subset of the plurality of flows.

17. The method of claim 14, wherein the particular criterion comprises:
an ascending or descending order of an SR identification (SR ID) of each SR configuration associated with each of the subset of the plurality of flows;
an ascending or descending order of an SR ID of a host SR; or
a priority associated with the corresponding SR configuration of each SR.

18. An apparatus comprising memory coupled to a baseband processor, the baseband processor configured to:
identify a plurality of flows corresponding to data to be sent in an uplink (UL) direction;
map a subset of the plurality of flows to a logical channel of a plurality of logical channels; and
multiplex, prior to transmission, two or more scheduling requests (SRs) into an integrated SR for requesting one or more physical uplink control channel (PUCCH) resources corresponding to each flow of the subset of the plurality of flows of at least one logical channel of the plurality of logical channels, each SR included in the integrated SR corresponding to a scheduling request for the data associated with at least one flow of the subset of the plurality of flows, and a payload of each SR in the integrated SR concatenated according to a particular criterion.

19. The apparatus of claim 18, wherein the particular criterion comprises:

an ascending or descending order of an SR identification (SR ID) of each SR configuration associated with each of the subset of the plurality of flows;

an ascending or descending order of an SR ID of a host SR; or a priority associated with the corresponding SR configuration of each SR.

20. The method of claim 18, wherein the one or more PUCCH resources requested using the integrated SR are selected based on a payload size of the data associated with each flow of the subset of the plurality of flows.

* * * * *